United States Patent [19]

Jacobsen

[11] Patent Number: 5,740,764
[45] Date of Patent: Apr. 21, 1998

[54] TANGLE-RESISTANT LEASH

[76] Inventor: Chris J. Jacobsen, 4020 County Rd. M, Middleton, Wis. 53562

[21] Appl. No.: 589,825

[22] Filed: Jan. 22, 1996

Related U.S. Application Data

[63] Continuation-in-part of Ser. No. 282,039, Jul. 28, 1994, Pat. No. 5,485,811.

[51] Int. Cl.$^6$ ...................................... A01K 27/00
[52] U.S. Cl. .................. 119/798; 119/792; D30/153
[58] Field of Search ........................ 119/795, 797, 119/798, 799, 792, 793, 769, 770, 771; 24/300, 301, 302; D30/151, 153; 224/184, 247; 273/414, 586, 329, 330; 482/44, 49, 124, 126, 906, 907

[56] References Cited

U.S. PATENT DOCUMENTS

| | | |
|---|---|---|
| 54,729 | 5/1866 | Howe . |
| 81,947 | 9/1868 | Vizard . |
| 2,196,627 | 4/1940 | Sanctis ...................... 119/792 |
| 2,684,682 | 7/1954 | Hudes et al. . |
| 2,712,932 | 7/1955 | Gould . |
| 2,737,154 | 3/1956 | Michonski . |
| 2,784,698 | 3/1957 | Dieppa . |
| 2,827,017 | 3/1958 | Ryan . |
| 2,861,547 | 11/1958 | Dale . |
| 2,866,436 | 12/1958 | Swain et al. . |
| 2,889,807 | 6/1959 | Beebe . |
| 2,908,522 | 10/1959 | Glave . |
| 2,909,154 | 10/1959 | Thomas . |
| 2,911,947 | 11/1959 | Kramer . |
| 2,919,946 | 1/1960 | Miener . |
| 2,937,023 | 5/1960 | Seymour et al. . |
| 2,962,197 | 11/1960 | Spangler, Jr. . |
| 2,994,300 | 8/1961 | Grahling . |
| 3,072,097 | 1/1963 | Morehand . |
| 3,096,741 | 7/1963 | Ollstein . |
| 3,104,650 | 9/1963 | Grahling . |
| 3,115,227 | 12/1963 | Shanok et al. . |
| 3,208,586 | 9/1965 | Wilson . |
| 3,214,166 | 10/1965 | Gaudet . |
| 3,244,149 | 4/1966 | Bosko et al. . |
| 3,269,495 | 8/1966 | Bush . |
| 3,332,298 | 7/1967 | Mintz . |
| 3,395,675 | 8/1968 | Fowlkes . |
| 3,416,220 | 12/1968 | Wilson . |
| 3,426,559 | 2/1969 | Schubach . |
| 3,441,005 | 4/1969 | Fink . |
| 3,548,906 | 12/1970 | Murphy . |
| 3,563,208 | 2/1971 | Nero . |
| 3,603,295 | 9/1971 | Shuman . |
| 3,722,478 | 3/1973 | Smith . |
| 3,752,127 | 8/1973 | Baker . |
| 3,783,835 | 1/1974 | Kepirq . |
| 3,867,905 | 2/1975 | Vail, Jr. . |
| 3,870,296 | 3/1975 | Ellis . |
| 3,884,190 | 5/1975 | Gurrey . |
| 3,910,234 | 10/1975 | Henson . |
| 3,948,477 | 4/1976 | Lample . |
| 4,019,463 | 4/1977 | Kitchen . |
| 4,120,073 | 10/1978 | Studebaker . |
| 4,161,051 | 7/1979 | Brodwin . |

(List continued on next page.)

FOREIGN PATENT DOCUMENTS

| | | | |
|---|---|---|---|
| 193945 | 2/1938 | Switzerland | 24/302 |
| 405131 | 7/1966 | Switzerland | 24/302 |
| 2258380 | 2/1993 | United Kingdom | 119/792 |

*Primary Examiner*—Todd E. Manahan
*Attorney, Agent, or Firm*—DeWitt Ross & Stevens SC

[57] ABSTRACT

A leash including a shock-absorbent substantially elastic lead is disclosed wherein the lead is not shaped like a simple beam, i.e., the lead includes one or more macroscopic concavities along its length. As examples, the lead may be shaped like a C-beam, I-beam, T-beam, or X-beam. The perimeters of the concavities form stiffening ridges which prevent the sagging or drooping of the lead and possible entanglement with the animal's or user's legs. By forming such concavities, material can be removed from the lead without adversely affecting its stiffness. An extender lead for extending the length of preexisting leashes is also disclosed.

22 Claims, 10 Drawing Sheets

U.S. PATENT DOCUMENTS

| | | |
|---|---|---|
| 4,165,713 | 8/1979 | Brawner et al. . |
| 4,167,156 | 9/1979 | Kupperman et al. . |
| 4,182,258 | 1/1980 | Presser . |
| 4,182,272 | 1/1980 | Taff . |
| 4,255,830 | 3/1981 | Wilson . |
| 4,292,932 | 10/1981 | Wooderson ........................... 119/771 |
| 4,306,629 | 12/1981 | Freemon ................................. 119/770 |
| 4,391,226 | 7/1983 | Guthrie . |
| 4,413,589 | 11/1983 | Bielen, Jr. et al. . |
| 4,488,511 | 12/1984 | Grassano . |
| 4,559,906 | 12/1985 | Smith . |
| 4,563,981 | 1/1986 | Kramer . |
| 4,638,764 | 1/1987 | Anderson . |
| 4,681,303 | 7/1987 | Grassano . |
| 4,735,035 | 4/1988 | Mattioli . |
| 4,745,883 | 5/1988 | Baggetta . |
| 4,763,609 | 8/1988 | Kulik . |
| 4,765,279 | 8/1988 | Klickstein . |
| 4,777,784 | 10/1988 | Ferguson . |
| 4,866,813 | 9/1989 | Dupont . |
| 4,879,972 | 11/1989 | Crowe et al. . |
| 4,887,551 | 12/1989 | Musetti . |
| 4,887,552 | 12/1989 | Hayden ................................... 119/795 |
| 4,892,063 | 1/1990 | Garrigan . |
| 4,903,638 | 2/1990 | Lacey . |
| 4,998,507 | 3/1991 | Browning . |
| 5,099,799 | 3/1992 | Giacobbe . |
| 5,233,942 | 8/1993 | Cooper et al. . |
| 5,291,856 | 3/1994 | Goller . |
| 5,351,654 | 10/1994 | Fuentes . |
| 5,373,814 | 12/1994 | Seymour ................................. 119/795 |

1

TANGLE-RESISTANT LEASH

CROSS-REFERENCE TO RELATED APPLICATION

This application is a continuation-in-part of U.S. application Ser. No. 08/282,039, filed 28 Jul. 1994 now U.S. Pat. No. 5,485,811.

FIELD OF THE INVENTION

The present invention relates generally to leashes and tethers for animals, and specifically to leashes and tethers which are resistant to sagging and tangling about an animal's legs.

DESCRIPTION OF THE PRIOR ART

Leashes and tethers for restraining the movement of animals have been known for centuries. Following is a survey of U.S. patents which illustrate animal leashes.

The following prior art illustrates a number of leashes which can be considered to be basic leashes.

U.S. Pat. No. 2,909,154 to Thomas illustrates a leash having a strap-like lead with a clip at one end and a handle loop and second clip at the other end. The clips and loops may be used in various ways to allow the leash to function as such and also as a tethering device to attach an animal to an anchoring object.

U.S. Pat. No. 4,167,156 to Kupperman et al. illustrates an animal leash comprising a highly reflective strap-like lead terminating in attachment means for attachment to an animal at one end and in a handle loop at its other end. The handle loop is formed by doubling a separate strap over and sandwiching the end of the lead at its ends, and then inserting fasteners through the ends of the lead and handle loop. The attachment means is in the form of a spring-loaded clip attached to a ring by a swivel connector. The ring is attached to the end of the lead by inserting the lead within the ring, doubling it over, and driving fasteners through the end of the lead.

U.S. Pat. No. 4,415,589 to Bielen, Jr. et al. illustrates a leash having a flexible lead resembling a looped strap which may function as a handle. The loop may engage an animal's collar, and it may be collapsed and attached onto the collar for easy transport.

U.S. Pat. No. 5,099,799 to Giacobbe illustrates a combined animal leash and collar comprising a strap-like elongated lead having a buckle at one end which allows that end of the leash to be formed into a collar, and a snap fastener at its other end which may be snapped at varying intermediate points along the lead to form a handle loop. A ring-like member may be located on the lead near its collar end to allow the lead to be coiled about the collar loop and retained within the member.

U.S. Pat. Des. No. 81,947 to Vizard illustrates a leash wherein a strap-like lead is doubled at one end and clamped to itself to form a handle loop. Attachment hearts is provided at the opposing end of the lead.

U.S. Pat. Des. No. 339,885 to Rebek illustrates a leash having a strap-like lead terminating in a handle loop at one end and in attachment means at the other end. The handle appears to be made of a padded or foam material looped into a generally triangular form and joined to the lead at a vertex of the triangle.

The prior art also illustrates basic leashes which are similar to those described above, and which are primarily of interest owing to their means of manufacture. Several examples of hand-manufactured leashes follow.

U.S. Pat. No. 2,827,017 to Ryan illustrates a leash having a strap-like lead with a handle loop at one end and attachment means at the other end. The Ryan leash is interesting for the fact that it needs no rivets, stitching, glue, or other machine assembly operations to affix the handle loop or attachment means to the lead. The handle loop is formed in the lead by providing the handle end of the lead with a clip, passing the handle end of the lead through the lead at any one of a series of longitudinally-aligned slits located along the lead, fitting a metal ring through the loop formed thereby, and then attaching the clip at the handle end of the lead to this ring. A similar procedure is used to place the attachment means on the opposite end of the lead. If desired, the clip may be removed and a metal ring attached instead so that a slip loop or "choker" collar may be formed from the clipped end of the lead.

U.S. Pat. No. 3,783,835 to Kepirq illustrates a leash including a strap-like lead. To provide handle and collar loops, the portions of the lead adjacent each of its ends is slit longitudinally. The ends of the leads are inserted therein and braided with the lead adjacent the slit.

The prior art further illustrates a number of leashes with flexible and elastically extensible leads. Examples of such leashes are set out below.

U.S. Pat. No. 1,924,596 to Davis illustrates a cord-like leash made of flexible rubber. A handle is integrally formed with the lead, and attachment means is provided at the other end of the lead. The attachment means is partially imbedded within the lead.

U.S. Pat. No. 3,096,741 to Ollstein illustrates a leash having a lead and integral collar made of braided stranded material. The collar and leash are extensible in both axial and radial directions, making the lead flexible and extensible and the collar comfortable to wear.

U.S. Pat. No. 3,603,295 to Shuman notes that the leash illustrated therein may be flexible and to some extent stretchable and deformable.

U.S. Pat. No. 4,777,784 to Ferguson illustrates a lead for tethering large animals comprising a central stretchable resilient core, a braided sheath covering the core, and a loosely fitting protective plastic outer covering disposed over the braided sheath. The lead stretches when subjected to tension, and the core has a stretch length breaking point less than the stretch length breaking point of the sheath. Therefore, if the lead is stretched to such an extent that the central core snaps, the sheath will still remain intact to restrain an animal.

U.S. Pat. Des. No. 337,182 to Small et al. illustrates a design for a "stretchable animal leash." The leash has a lead terminating at one end in an aperture for accommodating attachment means, and at the other end in a rod-like member aligned generally perpendicularly to the lead. A handle loop is formed by pivotably attaching a strap to the opposing ends of the rod-like section.

Also note U.S. Pat. No. 4,745,883 to Baggetta, discussed below, which illustrates a flexible and extensible child safety tether.

The prior art additionally illustrates leashes with leads which may be telescopically extended and retracted within a sheath or similar structure. Several examples follow.

U.S. Pat. No. 2,337,970 to Cassell illustrates a dog leash having a handle attached to a series of rigid spring-loaded telescopic tubes. At the end of the furthermost tube from the handle, a short flexible lead is provided with a clip at its end for attachment to an animal. The telescopic tubes provide a generally inflexible (but extensible) stick-type lead. A latch is provided so that the telescopic tubes may be fixed together at a set length to prevent undesired further extension.

U.S. Pat. No. 2,593,940 to Van Meter illustrates an animal leash having a loop attached to a tubular member. A spring is disposed within the tubular member, and a flexible cord-like lead is attached to the end of the spring to allow the lead to be extended at varying lengths out of the tube. The tube may include a plug at the juncture between the spring and the lead, and this plug may resist passage through the tube due to air pressure differences between the opposing sides of the plug. A clip is disposed at the end of the lead to allow attachment to an animal. The rigid tube is said to prevent entanglement of the leash about the user's hand, and it also allows a greater degree of control over the animal attached to the lead.

U.S. Pat. No. 2,737,154 to Michonski illustrates a leash having a handle loop at one end, a clip at the other end, and a flexible elastic lead therebetween comprised of an elastic cord disposed within the coils of a spring. The spring and the cord provide a flexible and extensible lead which is resistant to twisting or coiling about the legs of an animal.

U.S. Pat. No. 3,441,005 to Fink illustrates a leash which includes a semi-flexible, non-stretchable tube having a handle loop at one end. An elastic cord is enclosed within the tube and projects beyond the end of the tube to function as a lead. A clip is provided at the end of the cord for attachment to an animal. Means are also provided whereby the elastic cord may be attached to the tube at any point throughout the length thereof to allow variation in the stretch length of the elastic cord. These means are illustrated in the form of a sliding member which twists the tube and cord to inhibit stretching of the cord between the sliding member and the handle, but which allows stretching of the cord between the sliding member and the clip.

Several spring and/or pneumatic cylinders for allowing shock-absorbent expansion and contraction of leashes and tethers are illustrated in U.S. Pat. No. 197,615 to Dawson; U.S. Pat. No. 198,275 to Chase; U.S. Pat. No. 1,194,417 to Pelham; U.S. Pat. No. 2,712,932 to Gould; U.S. Pat. No. 4,488,511 to Grassano; and U.S. Pat. No. 4,681,303 to Grassano.

The prior art also illustrates substantially inelastic leads which are described to be resistant to sagging and tangling about an animal's legs, and which are often reputed to allow better control of an animal attached thereto. Several examples follow.

U.S. Pat. No. 54,729 to Howe illustrates a lead for animals wherein a number of bead-like members are strung onto a lead to add stiffness to the lead and to prevent it from easily coiling about the legs of an animal.

U.S. Pat. No. 2,322,897 to Van den Bogaerde, Jr. illustrates a leash having a loop at one end, a clip at its other, and a rod-like, inelastic lead disposed therebetween. The rigidity of the lead prevents it from coiling about the legs of an animal, and it also allows better control of the animal.

U.S. Pat. No. 236,091 to Rodger illustrates a leash lead wherein a rigid rod-like member is attached to the animal's collar. A flexible cord is then attached to the end of this rod to form the remainder of the lead. The rod-like member prevents the portion of the lead adjacent the animal's collar from tangling about the animal's legs.

U.S. Pat. No. 548,062 to Joyner illustrates a lead including a flexible cord-like portion connected to a spring portion. A clip is attached to one end of the spring for attachment to an animal. Cylindrical tubular members are disposed over the spring portion to prevent the spring portion of the lead from coiling about an animal's legs.

U.S. Pat. No. 1,509,781 to Roth illustrates a leash having a generally rectangular lead with a clip at one end for attachment to an animal and an integrally-formed handle loop at the other end. The lead is generally flexible, but the portion of the lead adjacent the clip contains a metal insert therein to add rigidity to that portion of the lead. A tubular sliding member may be disposed at varying points on the handle loop portion of the lead to vary the diameter of the handle loop.

U.S. Pat. No. 2,911,947 to Kramer illustrates a animal leash having a handle loop at one end, a clip at the other end, and a lead comprising a helical spring therebetween. The helical spring is coated with abrasion-resistant protective material to prevent the spring from damaging either the legs of an animal or other objects if the lead should rub against such objects. The lead is resistant to tangling about the legs of an animal or other objects owing to its tendency to maintain constant tension in the lead.

U.S. Pat. No. 3,395,675 to Fowlkes illustrates a leash intended for overhead attachment to a horizontally-suspended tether line. The leash includes clips on either end of a lead. The lead includes a centrally-located rigid bar attached to two short flexible lengths of chain at either end between the rod and the bar.

U.S. Pat. No. 3,722,478 to Smith illustrates a leash which comprises a number of rigid link members terminating in loops which may be attached to other link members, or which may instead serve as handle loops. The links may be clad in protective sheathing such as rubber. The rigidity of the members prevents them from tangling about the animal's legs or other objects, and they also prevent damage to an anchoring object to which the leash is attached.

U.S. Pat. No. 3,884,190 to Gurrey illustrates a leash lead formed of coiled wire coated with a softer sheathing material. The leash has a tendency to remain coiled as it is being used, and thus it remains clear of the ground and avoids entangling the animal's legs.

U.S. Pat. No. 4,735,035 to Mattioli illustrates a lead rope for use in a leash wherein the lead rope includes a tubular sheath made of a woven fabric and an inner core made of a soft fibrous material. At one end of the lead, the inner core is replaced by a rigid rod, and this end may be attached to the animal to prevent the lead from entangling the animal and to also allow greater control of the animal by grasping the rod.

U.S. Pat. No. 4,998,507 to Browning illustrates a leash lead made of resilient flexible material which is resistant to bending, but which may be curved or coiled by an animal owner when desired. Because the lead tends to restore itself to a generally straight condition, it will not tangle about an animal or other objects.

U.S. Pat. No. 5,291,856 to Goller illustrates a leash lead which is generally stiff and inflexible save for a flexible portion near its distal end. The stiff portion prevents the lead from becoming slack, dragging on the ground, and entangling the animal's legs.

Also note U.S. Pat. Nos. 2,994,300 and 3,104,650 to Grahling, discussed below, which illustrate a helical spring child safety tether.

Several patents illustrate leashes which are substantially inflexible to allow a high degree of control over an animal. Several examples follow.

U.S. Pat. No. 2,784,698 to Dieppa illustrates a short rigid leash comprised of a metal member having a handle at one end and a longitudinally-aligned slot. The slot at one end of the member may engage a peg on an animal's collar. A sleeve is then disposed over the member and in the slot so that it may slide down to abut the peg and prevent it from sliding within the slot. A thumbscrew is then provided on the sleeve to allow the sleeve to be affixed to the member so that it cannot slide and allow the peg to slip.

U.S. Pat. No. 3,244,149 to Bosko et al. illustrates various embodiments of an animal training stick wherein a lead is either slidably attached within eyelets, channels, or similar guides on or within the stick, or fixedly attached to the end of the stick to allow greater control of an animal. As an example of one embodiment, the training stick is provided with a handle at one end and a rigid tubular stick extending therefrom, with a flexible lead slidably disposed within the stick. By pulling on the end of the lead adjacent the handle loop, the animal may be pulled closer to the end of the stick. In all embodiments, the lead may be pulled to shorten its operational length at the end of the stick. Because the sticks are rigid, the animal is subject to a greater degree of control.

The prior art illustrates several leashes with leads which automatically retract within a winding drum or similar containment means when tension is relieved from the lead. A summary of such leashes follows.

U.S. Pat. No. 2,314,504 to Lifschultz illustrates a leash having a handle which acts as a winding drum. A leaf spring within the handle maintains tension on the lead as it is withdrawn and prevents the lead from sagging and tangling the legs of an animal, and it also prevents the need for having to re-coil the lead within the handle manually. Quick-acting lock means are illustrated whereby the user may prevent the lead from playing out or winding in after the lead has been extended from the handle by a desired length. A clip is provided at the end of the lead to attach the lead to an animal.

U.S. Pat. No. 2,889,807 to Beebe illustrates a dog leash having a cord-like lead terminating in a handle loop at one end and in a winding drum at the other end. The winding drum, which automatically spools the lead into and out of the drum, is attached to an animal's collar. Different methods of constructing the winding drum to extend the life of the leash are described.

U.S. Pat. No. 4,165,713 to Brawner et al. illustrates a retractable leash having a winding drum wherein a spring-biased rotatable reel is provided to allow a lead and clip to be pulled therefrom and automatically reeled in when tension on the lead is relieved. A handle encircles and resiliently biases into engagement with the winding drum when the leash is not in use.

U.S. Pat. No. 4,887,551 to Musetti illustrates a retractable leash wherein a lead is attached to a spring mounted within a winding drum to allow the lead to be manually pulled out of the winding drum and automatically reeled back in by the spring.

U.S. Pat. Des. No. 339,430 to Reed et al. illustrates a housing/handle for a retractable leash wherein the winding drum has finger indentations on one of its circumferential sides. The lead extends from the drum at a side of the housing opposite the indentations.

U.S. Pat. Des. No. 341,682 to Musetti illustrates a housing/handle for a retractable leash wherein the winding dram has finger indentations on one of its circumferential sides, and wherein the lead extends between the user's fingers.

U.S. Pat. Des. No. 351,264 to Stout illustrates a housing/handle for a retractable leash wherein a handle loop with finger indentations extends from a circumferential side of the winding drum.

Closely related to the leashes with retractable leads are leashes which contain containment means for containing their leads when they are not in use. A summary of several such leashes follows.

U.S. Pat. No. 2,866,436 to Swain et al. illustrates a leash having a handle formed of a generally elliptical ring through which a user's fingers may be extended. A slot extends about the circumference of the ring. A cord-like lead may be tied within this slot and then coiled within the slot by winding it about the handle. A clip is provided at the end of the lead. A bead-like plug may be affixed to the lead adjacent the clip so that the plug may be friction-fit into the slot, thereby allowing the handle to be carried without having the lead unwinding.

U.S. Pat. No. 5,233,942 to Cooper et al. illustrates a carrying case which attaches to a pet collar and which contains a leash therein. The leash may be quickly deployed from the carrying case by grasping the leash handle and pulling the cord-like leash from the carrying case.

The prior art includes leashes which have attachment means for attachment to an animal wherein the attachment means may be quickly and remotely disengaged to allow the animal to be released. Examples of such leashes follow.

U.S. Pat. No. 1,161,870 to Kunze illustrates a lead with a first handle loop formed adjacent its middle portion. The lead is doubled over so that the first handle loop is adjacent the fold, and the end of the lead closest to the first handle loop is provided with a clip. The other end of the lead is provided with a ring which is capable of engaging the legs of the clip to open it. By doubling the lead over, a second handle loop is formed adjacent the first handle loop. When the clip is affixed to an animal and the first handle loop is grasped, the leash may be used in an ordinary fashion. When the first handle loop is released and the second handle loop is grasped instead, the ring will engage the clip to allow it to open. Therefore, the leash provides a quick-release restraining device for police dogs and the like.

U.S. Pat. No. 3,910,234 to Henson illustrates a leash having an inflexible tubular lead with a central flexible portion, a handle loop at one end, and an arcuate bend at the other end. A spring-loaded rod member is disposed within the tubular lead adjacent the arcuate bend to close the arcuate bend, thereby forming attachment means for attaching the lead to an animal. An elongated member is attached to the rod member and extends through tubular lead, and also through the central passage of the spring up to the handle loop, where it terminates in a finger loop. When the finger loop is actuated, the member is pulled out of the arcuate bend to quickly release an animal.

U.S. Pat. No. 4,903,638 to Lacey illustrates an animal leash similar to that of U.S. Pat. No. 3,910,234 to Henson. The leash includes a handle loop and a flexible lead which terminates in a clip whose jaws are held latched by a yieldably biased sleeve disposed about the jaws. The sleeve is retractable by a pull cord extending rearwardly within the lead and terminating near the handle loop. The clip may be remotely detached by pulling the pull cord.

The prior art illustrates a number of leashes which include leads with multiple straps and loops to provide multiple handles for varying degrees of control over the animal. Examples of such leashes follow.

U.S. Pat. No. 2,861,547 to Dale illustrates a leash having a strap-type lead with a handle loop at one end and attachment means at the other end. Buckles and rings are provided whereby the lead may be formed into one or more loops of varying size, thereby allowing varying degrees of control over an animal attached to the leash.

U.S. Pat. No. 3,332,398 to Mintz illustrates a strap-like leash lead which terminates in handle loops at both ends. One handle loop can be attached to the animal's collar by use of attachment means and the opposing handle loop can be used as a handle. Alternatively, both ends can be attached to the animal's collar to provide a shorter lead with a larger loop which can be used as a handle. In that case, either or both of the handle loops could also be grasped to provide greater control over the animal.

U.S. Pat. No. 3,752,127 to Baker illustrates an animal leash having a strap-like lead terminating in loops at both of its ends, one of which is larger than the other and which is capable of serving as a handle. Each loop includes attachment means which may be attached to an animal's collar or to the loop at the opposite end of the lead. If desired, either attachment means may be attached to the loop at the opposite end of the lead to form a large loop, allowing the attachment of the lead to a fencepost or the like.

U.S. Pat. No. 4,763,609 to Kulik illustrates a leash including multiple strap-like leads connected together by rings and terminating in attachment means. The lead may be folded over itself at different points and the attachment means may be connected to different rings to form handle loops or anchoring loops of varying size.

U.S. Pat. No. 5,351,654 to Fuentes illustrates a lead which is generally made of two straps connected together by rings to form a lead made of multiple connected loops. The loops allow different portions of the lead to serve equally well as handles or as anchoring points for tethering of collars or leads.

Also see U.S. Pat. No. 1,161,870 to Kunze, discussed above, for another example of a multi-loop, multi-handle lead.

The prior art illustrates several examples of leashes adapted to allow the tethering of several animals. Examples of such leashes follow.

U.S. Pat. No. 4,879,972 to Crowe et al. illustrates a leash for two animals. A main leash includes a handle lead having large attachment means at one end and a handle loop at its other end. Two secondary leashes are also provided. These secondary leashes are similar to the main leash, but have smaller handle loops and attachment means. These secondary leashes may have their loops engaged in the large attachment means, and then their attachment means may be attached to animals.

U.S. Pat. No. 4,892,063 to Garrigan illustrates a leash for two or more animals comprising multiple leads having attachment means at one end and rings or ring clips at the other end. Several leads can be all engaged together at a common ring or ring clip, thereby forming a multiplicity of leads all extending from the common point. A tubular handle member may then be slid over the common point to provide a common handle for all of the leads.

U.S. Pat. No. 3,563,208 to Nero and U.S. Pat. No. 4,563,981 to Kramer, discussed below, also describe multi-lead child safety tethers.

The prior art illustrates a number of leashes which include slip loop or "choker" collars wherein pulling on the lead causes the animal's collar to tighten. Examples of such leashes follow.

U.S. Pat. No. 2,289,802 to Norton illustrates a cord-like leash wherein one end is looped over and clamped to an intermediate portion of the lead to provide a handle loop, and which is similarly looped over and clamped at the other end to provide a small loop. The lead may be extended through the small loop to form a collar loop. A rectangular-shaped ring is then disposed about both the collar and the lead adjacent the small loop. The loop collar may be manually adjusted to different sizes, but the rectangular ring prevents the lead from slipping and allowing the collar loop to change in size.

U.S. Pat. No. 3,867,905 to Vail, Jr. illustrates a leash having a lead made of chain which terminates in a handle loop at one end. A lock housing is disposed at the other end of the lead and is adapted to receive an intermediate portion of the lead. The lock housing may be slid along the intermediate portion of the chain to form a variably-sized collar loop. The size of the collar loop may be fixed by turning a key within the lock housing, which causes the lock housing to engage the chain lead.

U.S. Pat. No. 4,019,463 to Kitchen illustrates strap-like and cord-like leashes having a handle loop at one end and an adjustably-sized collar loop at the other end. The patent illustrates different means for sliding about an intermediate portion of the lead and adjusting the size of the collar loop, and these may be generally described as sliders which engage a terminal end of the lead and which also slidably engage an intermediate portion of the lead. Stop knobs or knots may be provided on the collar loop to prevent the loop from reducing in size to such an extent that the animal is choked.

Also see U.S. Pat. No. 1,924,596 to Davis and U.S. Pat. No. 2,827,017 to Ryan for other examples of a choker collar. In particular, U.S. Pat. No. 1,924,596 to Davis illustrates a rubber leash wherein the choker collar loop automatically releases after it is tugged and tightened owing to the resilience of the rubber lead.

The prior art includes several examples of unique leash handles with varying structures and functions. Examples of these leash handles follow.

U.S. Pat. No. 3,603,295 to Shuman illustrates a leash lead which appears to include a choke collar opposite the handle end of the lead. The handle end of the lead is looped over and inserted within an aperture on an intermediate portion of the lead, thereby forming a slip loop which functions as a handle loop for fitting about a user's wrist. The handle end of the lead terminates in a hand grip which may be grasped by the user's fingers. Thus, when a user inserts his or her hand within the handle loop and grasps the hand grip, any pulling on the hand grip (as when the animal tugs on the lead) will cause the handle loop to tighten about the user's wrist.

U.S. Pat. No. 4,391,226 to Guthrie illustrates a handle for a dog leash whereby the lead slidably passes through an aperture in the handle. The lead may be fixably retained on the handle by adjusting a finger knob which actuates a cam against the lead within the interior of the handle.

U.S. Pat. Des. No. 175,316 to Roccia illustrates a rod-like leash handle having twisted cable configuration. The leash handle includes a strap-like buckled loop protruding from one end of the handle and an eyelet at the other end.

U.S. Pat. Des. No. 281,631 to Konar illustrates a leash handle design wherein the handle includes a generally trapezoidally shaped loop with a wider proximal end and a narrower distal end. A clip is imbedded within the distal end to attach the handle to a lead. The proximal end includes a smooth side on the exterior of the loop and finger ridges on the inside of the loop for accommodating fingers. Straight limbs connect the proximal and distal ends and close the loop.

U.S. Pat. Des. No. 298,479 to Ticknor illustrates a leash handle which appears to be a hollow, generally U-shaped member with apertures at each of its ends. The lead may be inserted within the apertures and then fastened to itself so that when the lead is taut, the handle forms a grasping portion at the base of a generally triangular handle loop in the lead. The handle is shaped to generally accommodate a hand.

The prior art illustrates several leashes which provide for anchoring the leash to the animal owner by means other than the owner's grasping of a leash handle. Examples of such leashes follow.

U.S. Pat. No. 2,333,488 to Parth illustrates a leash which is generally comprised of two leads with a swivel attachment therebetween. Each lead is made of a looped strap. The strap of one loop passes through the animal's collar (or through a ring thereon), and it includes a quick-release clip to allow the loop to be quickly opened to release the animal. The other loop is designed to fit about the waist or shoulders of the user so that the user may restrain the animal while having both hands free. This loop includes buckles and slip rings to allow its size to be adjusted.

Also see U.S. Pat. No. 4,638,764 to Anderson, discussed below, which illustrates a child safety tether adapted to be anchored about a parent's waist.

The prior art illustrates several leashes which include built-in means for assisting in the training of animals. Examples of these leashes follow.

U.S. Pat. No. 3,072,097 to Morchand illustrates an animal leash having a strap-like lead with a handle loop at one end and a clip at the other end. An air passage is disposed throughout the length of the lead. The end of the air passage adjacent the animal includes a whistle, and the end of the air passage adjacent the handle loop includes a compressible air bulb. The animal owner may squeeze the air bulb to activate the whistle for use in training the animal.

U.S. Pat. No. 4,182,272 to Taff illustrates an animal training stick resting within the coils of a helical spring. A cord-like lead with terminal attachment means is attached to the end of the helical spring. The lead passes through one or more eyes or similar guide members along the staff. The first end of the staff is intended to be attached to a wall, tree, or similar anchoring object, and an animal is attached to the attachment means. If the animal should lunge at passerby, the tension in the spring will pull on the stick and cause it to follow and strike the animal.

The prior art illustrates several harnesses for engaging the bodies of animals for purposes of increased control. U.S. Pat. Nos. 1,556,362 to Silbert and U.S. Pat. No. 2,526,140 to Keyston illustrate animal harnesses. U.S. Pat. No. 3,870,296 to Ellis illustrates a novelty harness for walking a nonexistent animal. U.S. Pat. No. 4,559,906 to Smith illustrates an animal harness which incorporates a handle disposed along the animal's back for carrying the animal. U.S. Pat. Des. No. 240,142 to Francis illustrates a dog control harness wherein a lead is connected to a harness which engages both the front portion of the dog's body and which also has a portion which engages the dog's tail.

The prior art also illustrates various leashes, i.e., safety tethers or restraining devices, for use on humans. Examples of these safety tethers follow.

U.S. Pat. No. 2,650,590 to Moore et al. illustrates an infant restraining device comprising a flexible elastic strap having two ends with snap members thereon. The snap members can be engaged to intermediate portions of the lead to provide loops at both ends of the lead. These loops may be placed about the legs of an infant to hinder the infant's movement.

U.S. Pat. No. 2,994,300 to Grahling illustrates a safety tether for a child. Collar-like loops are provided at either end of a helical spring lead which maintains constant tension between the loops. The loops may be detached from the lead by means of clips provided at the junctures between the loops and the lead.

U.S. Pat. No. 3,104,650 to Grahling illustrates a child safety tether similar to the one illustrated in the earlier U.S. Pat. No. 2,994,300 to Grahling.

U.S. Pat. No. 3,426,559 to Schubach et al. illustrates a device for restraining prisoners comprising an elongated flexible cord having a small terminal loop at one of its ends. This small loop is received about an intermediate portion of the cord to form a first loop. The cord further includes a snap hook at its opposite end which is detachably connected to an intermediate portion of the cord to form a second loop. The first and second loops may be connected about the wrists or ankles of a prisoner.

U.S. Pat. No. 3,563,208 to Nero illustrates an elongated main lead having a number of secondary leads and handle loops branching off therefrom for grasping by children. The device is intended to maintain the children in an organized group.

U.S. Pat. No. 4,563,981 to Kramer illustrates a device similar to that of U.S. Pat. No. 3,563,208 to Nero. Two leads extend from a common juncture, and handles are placed at various points on the leads for grasping by children. A handle for an adult is located at the common juncture.

U.S. Pat. No. 4,638,764 to Anderson illustrates a child safety tether comprising a flexible strap-like lead having first and second ends, each of which contain loops which may be detachably secured about the arm or waist of a child or adult.

U.S. Pat. No. 4,745,883 to Baggetta illustrates a child safety tether with two opposing loops and a lead therebetween. The lead is stretchable and includes an elastic member enclosed within a loose cloth sheath, the sheath being capable of accommodating stretching of the elastic member. Certain preferred stretch ratios for the lead are defined. The lead is illustrated with a generally rectangular, strap-like cross-section.

U.S. Pat. No. 4,765,279 to Klickstein illustrates a child safety tether comprising a flexible strap terminating at an adjustable loop at either end for attachment to the wrists of children or adults. The intermediate portion of the loop may be doubled over and buckled to allow the lead to be shortened.

Of the prior art patents, those which are believed to be most relevant to the present invention are U.S. Pat. No. 54,729 to Howe, U.S. Pat. No. 2,322,897 to Van den Bogaerde, Jr., U.S. Pat. No. 236,091 to Rodger, U.S. Pat. No. 548,062 to Joyner, U.S. Pat. No. 1,509,781 to Roth, U.S. Pat. No. 2,911,947 to Kramer, U.S. Pat. No. 3,395,675 to Fowlkes, U.S. Pat. No. 3,722,478 to Smith, U.S. Pat. No. 3,884,190 to Gurrey, U.S. Pat. No. 4,735,035 to Mattioli, U.S. Pat. No. 4,998,507 to Browning, and U.S. Pat. No. 5,291,856 to Goller, since these patents illustrate leashes and tethers which include stiffening means for preventing sagging of the leash and entanglement about an animal's legs.

However, none of the patents noted above disclose or suggest a leash which is formed of only a single part (or only a very few parts) for simplicity and ease of manufacture; which resists tangling, sagging, and dragging on the ground during use; which is exceptionally attractive and durable in appearance, and thereby has enhanced commercial appeal; which is elastically extensible and shock-absorbent; which is extremely durable, but light in weight; and which is resistant to rusting, fouling, and collection of debris (which can occur in the leashes which feature multiple metal parts, springs, and links). Moreover, none of the patents listed above disclose or suggest such a leash which is rigidly or integrally connected to a substantially inelastic and nondeformable handle to provide better control over the animal. Further, the patents listed above illustrate leashes which fail to offer a wide variety of packaging and display modes for point-of-sale promotion.

SUMMARY OF THE INVENTION

The present invention encompasses a leash comprising an elongated elastomeric lead including at least one macroscopic concave depression therein. The macroscopic concave depression may extend along only a portion of the lead, or it may extend along a major portion of the length of the lead. Owing to the presence of one or more concave depressions on the lead, the lead may have a cross-section which defines an I-shape, a T-shape, a C-shape, an X-shape, or an S-shape. Embossed indicia may protrude from the floors of the concave depressions to display words or symbols. One end of the lead has attachment means thereon for attaching items to the lead, and the other end of the lead may include either a handle or second attachment means. If a handle is included, it is preferably substantially rigid and integrally molded with the lead. If second attachment means are included rather than a handle, the leash is in the form of an extender lead suitable for attachment to the end of a preexisting leash to provide it with greater length.

The present invention also encompasses a leash comprising an elongated substantially elastic integrally molded lead including at least one stiffening ridge thereon. The stiffening ridge may extend over a minor portion of the length of the lead, or it may extend over a major portion of the length of the lead to give the lead a substantially uniform cross-section over its length. Owing to the presence of the stiffening ridges in the lead, the lead may have a cross-section in the form of an I-shape, a T-shape, a C-shape, an X-shape, or an S-shape. The leash may include a handle at one end of the lead, and the handle is preferably substantially rigid and integrally formed with the lead. The leash may include one or more depressed areas formed therein, e.g., in the lead or handle, and the depressed areas may include embossed indicia therein which display words or symbols.

The present invention further encompasses a leash comprising an elongated substantially elastic lead including at least one stiffening ridge extending along a major portion of its length, wherein the lead has a proximal end including a substantially rigid handle integrally formed with the lead and a distal end including attachment means for attaching items.

One important aspect of the leash of the present invention is its use of a lead which is not shaped like a simple beam. Generally, the term "simple beam" is used to define an elongated member having a circular or simple polygonal cross-section. As examples, elongated members having cross-sections in the shape of a parallelogram or a rectangle are classic simple beams. Throughout this specification, the term "simple beam" will be used to define all elongated members whose cross-sections do not include a macroscopically concave portion; that is, when looking at the cross-section of the elongated member, each visible surface of the member meets each other visible surface of the member at an angle of less than 180 degrees (as measured from the interior of the cross-section). Thus, according to this definition, a non-simple or "complex" beam includes elongated members having cross-sections with a concavity along their lengths, such as elongated members with "I," "T," "C," "X," and "S" cross-sections, among others.

Despite the fact that leashes have likely been known and used for literally thousands of years, the prior art does not disclose or suggest the use of a complex beam as a lead for a leash. Moreover, the prior art does not disclose or suggest the use of a leash which includes a lead shaped like a complex beam wherein the lead is also substantially elastic, or such a leash wherein the leash includes a substantially rigid handle integrally molded with the lead. Leashes according to the present invention have numerous advantages over the leashes of the prior art.

Initially, a lead shaped like a complex beam can be made more resistant to sagging than a lead having the same cross-sectional area which is shaped like a simple beam. To illustrate, if one visualizes X and Y axes centered on the cross-section of a lead shaped like a simple beam, the tendency for the lead to sag within a plane defined by the length of the lead and either of the X or Y axes depends on the amount of lead material above and below the other axis, and its distance from that axis. Another way of stating this is that the tendency of the lead to sag about a plane defined by the length of the lead and one axis depends on the moment of inertia of the lead about the other axis. Therefore, if a strip of material located along the Y axis is removed from the length of the lead to form a valley, and this material is then used to form ridges on the lead about both sides of the valley, the moment of inertia of the lead about the X axis is increased and the stiffness of the lead in the Y plane is increased. As the ridge height increases, so does the stiffness of the lead. Using this principle, one may remove strips of material along a lead to achieve lower weight and savings in materials costs, while at the same time maintaining the stiffness of the lead at an acceptable level. The stiffness of the leash can thereby be engineered to prevent the leash from drooping and entangling the animal's legs or the user's legs, or from dragging on the ground or in nearby brush and weeds. Additionally, the inherent rigidity of a lead shaped like a complex beam allows greater control over an animal and allows the animal owner to more easily feel any tension or resistance offered by the animal.

The use of a substantially elastic lead allows the leash to be elastically extensible and shock-absorbent. Thus, if the leash is sharply tugged or if the animal should bolt, there is lesser chance of injuring the animal's neck or ripping the leash handle from the animal owner's grasp. Moreover, the use of a complex beam for the lead allows the leash to achieve all of the advantages of a substantially elastic lead while decreasing the undesirable sagging that tends to occur in leashes made of elastic material.

The use of a molded elastic lead is superior to elastic leads using springs, woven cords, and similar structures because springs and woven structures will suddenly cease stretching and "jerk" when they are fully extended, and this can injure the animal or pull the leash from the user's hand. However, the molded elastic leash of the present invention is "infinitely" extensible: it will continue to stretch until its tensile strength is exceeded, so no jerking is encountered. Breakage is not a problem because the elasticity of the leash renders it unbreakable for all practical purposes during standard use when the lead has a tensile strength of 150 pounds or so.

Leash leads shaped like complex beams have the additional advantage that they may be designed to obtain an appearance which is highly attractive to customers while still keeping the weight of the leash within reason. Where a molded elastomer is used to form a leash, it is apparent that the leash lead may generally be made thinner if the leash is made of stronger elastomer. However, it has been found that consumers often will not accept molded elastic leashes having thin leads. Even though a thin lead molded of natural or synthetic elastomeric material may be strong enough to endure several hundred pounds of tension, consumers tend to doubt the durability of such leads when compared to corded or chain leads having the same diameter. Even where a consumer consciously realizes that a thin molded leash is strong enough to endure any stress it might encounter, a thin lead has a weak appearance to the consumer's eyes, and this can deter purchases. Therefore, it has heretofore been advisable to manufacture molded elastomeric leashes with excess bulk, even if this bulk makes the leash far stronger than it needs to be. However, the excess bulk increases the weight of the leash and also increases its cost, and these drawbacks also deter purchases. By manufacturing a leash having a complex member for the lead, e.g., by removing strips of material along the lead to form valleys, the bulk of the leash is not markedly decreased to the consumer's eye, but its weight and material costs are.

The formation of valleys along the length of the lead offers other advantages as well. The floors of the valleys may be colored differently from the remainder of the lead to lend it an attractive appearance. The valleys also provide areas for the placement of cardboard inserts or other packaging material. If the leash is made of elastomeric materials, which generally have a high coefficient of friction, the inserts will tend to resist dislodgement from the valleys until the lead is bent or stretched.

The leashes according to the present invention also offer numerous advantageous features apart from their leads. In the following passages, various handles will be disclosed which are believed to offer significantly better grippability than handles of the prior art leashes, with significantly greater comfort to the user's hands. Additional control over the animal and grip comfort may be obtained where a substantially inelastic and nondeformable handle is integrally molded with a substantially elastic lead. Insignia may be embossed or debossed into the handle region, thereby enhancing the grippability of the leash and simultaneously allowing the manufacturer to readily display its trade name or trademark directly upon the leash. Additionally, an extender lead will be disclosed which allows the length of the leash to be increased when desired.

The embossment and/or debossment of trademarks and other indicia on the leash, and the use of the valleys for the display of packaging inserts, are beneficial because they offer a form of point-of-sale promotion which is new and unusual in the world of leash marketing. Because it is unusual, leashes according to the present invention tend to attract consumers' attention more than other animal supplies which the leashes share shelf space with. Additionally, the prior art leashes are generally limited to the use of packaging which fits within two extremes: either simple hang-tags and the like, or complex and expensive packaging, e.g., boxes. The leashes according to the present invention are far more flexible in their modes of packaging, which is highly beneficial in light of the well-known fact that packaging has a major effect on the sales of goods.

The leash of the present invention offers numerous animal handling advantages over the leashes of the prior art. For example, the animal owner may jog with the animal without worrying about entangling his or her legs or the animal's legs, and the shock-absorbent qualities of the leash avoid abruptly jerking the animal owner or the animal when the leash is drawn taut during running. The handle of the leash allows the animal owner to obtain a firm grip on the leash without having to squeeze the handle or otherwise exert significant force on the handle. If the leash is too short to allow the animal owner to jog with a large animal without the possibility of bumping the animal, the animal owner may add an extender lead onto the end of the leash to increase its length and decrease the possibility of colliding with the animal.

Additionally, leashes according to the present invention are exceedingly durable, relatively inexpensive to manufacture, attractive in appearance, and easy to clean.

Further features and advantages of the invention will be apparent from the detailed description located in this specification before the claims.

DETAILED DESCRIPTION OF THE INVENTION

Figure 1:
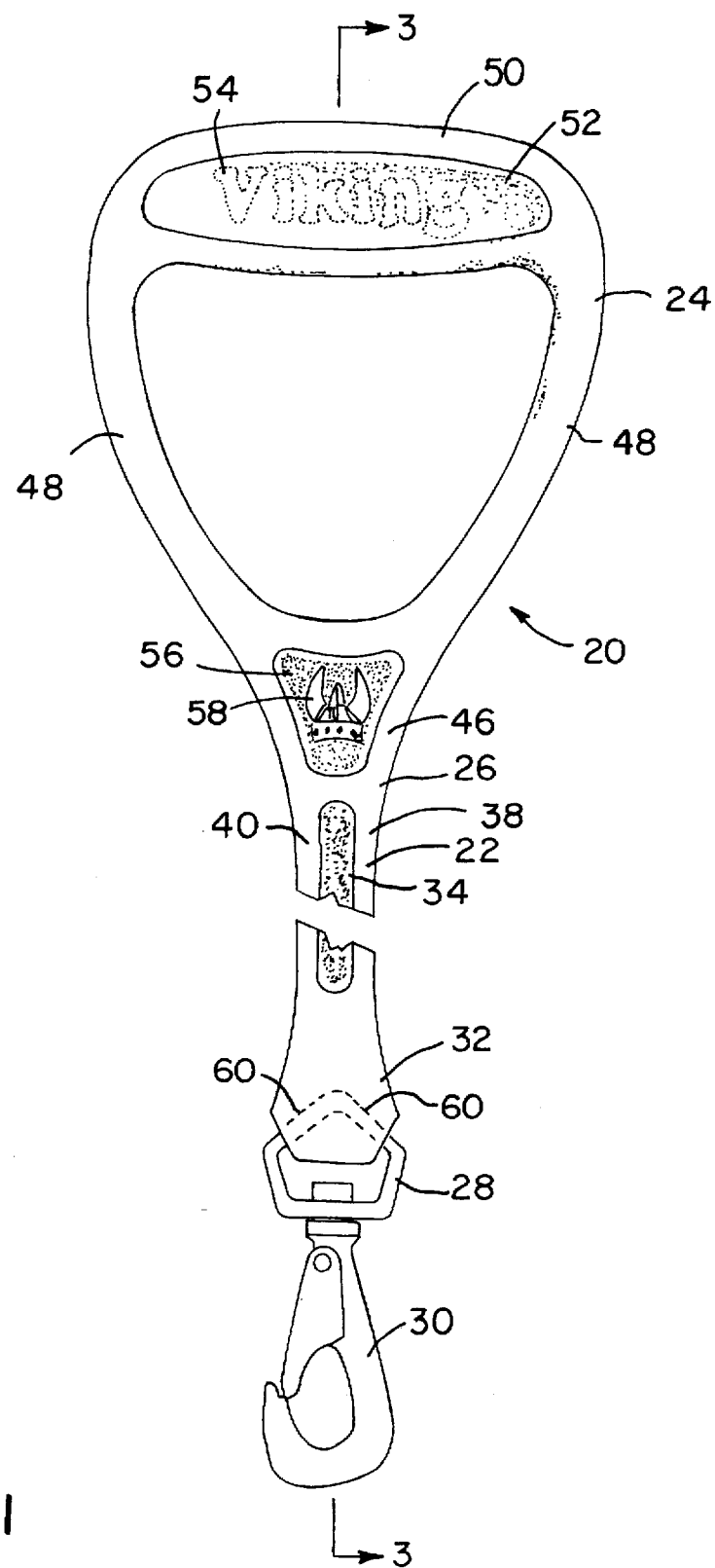
FIG. 1 is a side elevated view of a first embodiment of the leash of the present invention, shown with a portion of the lead removed.

Following is a description of the preferred embodiments of the invention. Throughout this description, it is understood that the same or similar features are denoted in the drawings by the same reference numerals.

Figure 2:
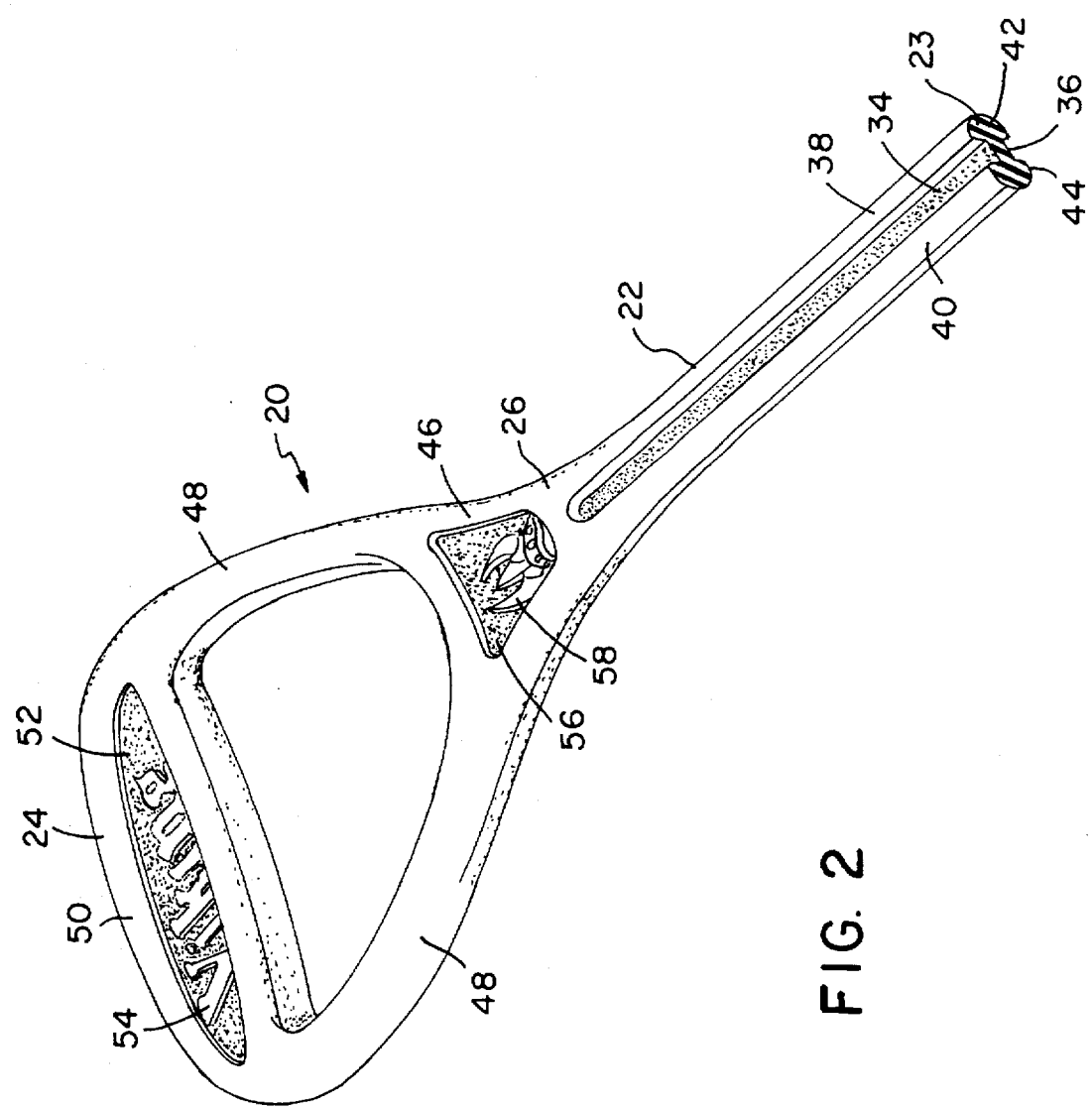
FIG. 2 is a perspective view of a section of the leash of FIG. 1.
Figure 3:
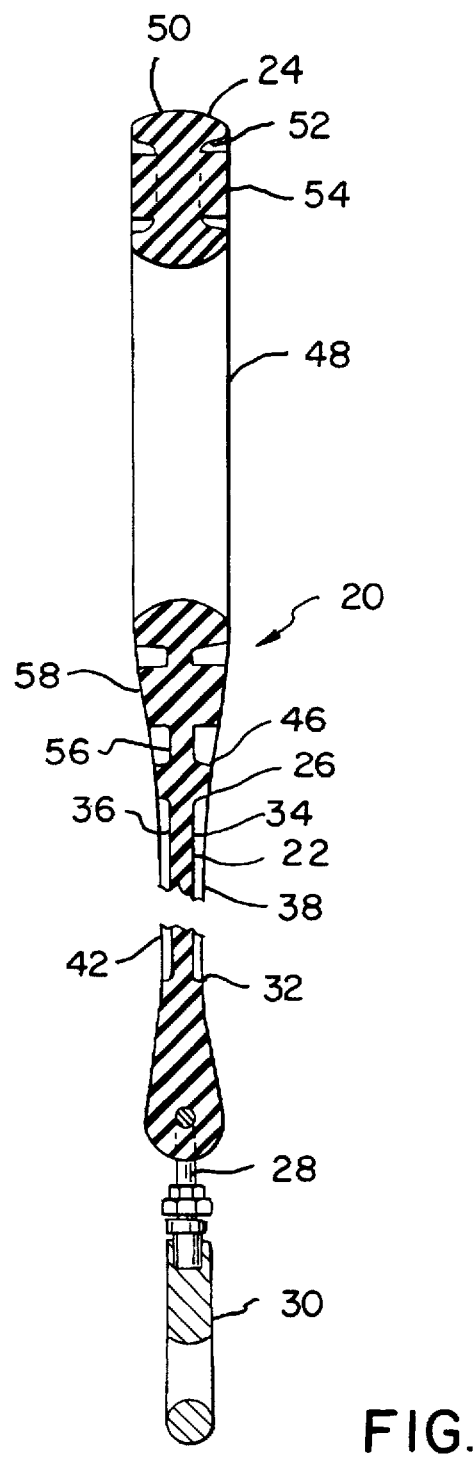
FIG. 3 is a cross-sectional view of the leash shown along the line 3—3 in FIG. 1.

A first embodiment of the leash of the present invention is shown in FIGS. 1–3 by the reference numeral 20. The leash 20 includes a lead 22 terminating in a handle 24 at its proximal end 26, and a ring 28 with a clip 30 attached thereto at its distal end 32. Each of these parts of the leash 20 will now be discussed in turn.

Initially, the lead 22 and handle 24 are integrally molded of rubber, though any other elastic shock-absorbent material may be used, such as butyl rubber, isoprene, neoprene, and hypalon. A flexible generally porous or foamed synthetic material, e.g., foam rubber, may be used as well. The lead 22 and handle 24 may be formed by conventional injection molding processes or any other forming means known to the art. The ring 28 can fit within a cavity in the mold so that the lead 22 and handle 24 material can flow and solidify around the ring 28, thereby imbedding it within the lead 22.

As best illustrated in FIG. 2, the lead 22 is an elongated member having a generally uniform I-shaped cross-section, illustrated at 23, along a major portion of its length. A first valley 34 is located on one side of the lead 22 and a second valley 36 is located on the opposite side of the lead 22 to define the I-shaped cross section of the lead 22. The formation of the first and second valleys 34 and 36 along the length of the lead 22 defines ridges 38 and 40 bounding the longitudinal sides of the first valley 34, and ridges 42 and 44 bounding the longitudinal sides of the second valley 36. Owing to the presence of these ridges, the lead 22 is less flexible than a lead having the same cross-sectional area which lacks the ridges 38, 40, 42, and 44, i.e., a lead shaped like a simple beam. Another way of explaining this is that given a set lead length and a set cross-sectional lead area (i.e., a set amount of material with which to form a lead), the lead may be made stiffer and more resistant to bending by removing strips of material longitudinally along the lead, thereby forming valleys, and then adding the removed strips of material to the areas adjacent the valleys. The addition of these ridges increases the moment of inertia of the lead and increases its resistance to bending moments. Therefore, the ridges 38, 40, 42, and 44 may be used to provide additional stiffness along the length of the lead 22 and prevent the lead 22 from sagging or drooping as the leash 20 is being used.

There are additional advantages to leads 22 shaped like complex beams apart from their enhanced stiffness. Strips of material may be removed from the lead 22 to form valleys such as the first and second valleys 34 and 36 to decrease the weight of the lead 22 without adversely affecting the lead stiffness, and at the same time the bulk of the lead 22 will not be visibly decreased. Therefore, potential purchasers of the leash 20 are left with the impression that the lead 22 is strong owing to its apparent size. This impression is further enhanced by providing the lead 22 with greater size in one dimension, i.e., by providing the lead 22 with a substantially rectangular or ovular cross-section as illustrated by FIG. 2, rather than a square or circular cross-section.

The lead 22 is connected to the handle 24 at a juncture 46. While the handle 24 is ideally integrally molded with the substantially elastic lead 22, the handle 24 is preferably formed with dimensions such that it is substantially rigid and nondeformable under general conditions of use. The handle 24 includes two side portions 48 which branch out from the juncture 46 to join with a grip portion 50. The side portions 48 and the grip portion 50 define a generally triangular handle 24 which is suited for gripping by the animal owner at the grip portion 50. To enhance the grippability of the grip portion 50, the grip portion 50 is given a slightly rounded profile, as illustrated in FIG. 3. The grippability of the grip portion 50 is further enhanced by giving it an irregular surface contour. A depressed area 52 is formed within the grip portion 50, and embossed sections 54 then protrude from the depressed area 52. The depressions 52 help serve much the same purpose as the valleys 34 and 36: they help to decrease the weight of the leash 20 without affecting its apparent size or adversely affecting its stiffness. Meanwhile, the areas bounding the depressed areas 52 provide reinforcement so the strength of the leash is not adversely affected.

As illustrated in FIGS. 1–3, the embossed sections 54 may form insignia such as a trademark or tradename, e.g., VIKING. Therefore, the adjacent depressed areas 52 and embossed sections 54 provide the grip portion 50 with an irregular surface contour having high grip friction, and at the same time they may provide a means of promotion to the manufacturer of the leash 20. Rather than displaying a trademark or trade name, e.g., VIKING, the embossed section 54 could instead be customized to display the name or picture of the animal that will be using the leash 20. This could be achieved, for example, by using prefabricated leash mold inserts which bear the desired indicia to form the animal's name and/or image. A grip portion 50 with high grippability may also be formed by eliminating the embossed sections 54 and only using depressed areas 52, or by eliminating the depressed areas 52 and only utilizing embossed sections 54 which protrude directly from the grip portion 50. However, the combination of the depressed areas 52 and embossed sections 54 as shown in FIGS. 1–3 has been found to be especially attractive, and it provides an especially high degree of grip strength.

Quite frequently, an animal owner will grasp the leash 20 by extending his or her hand through the loop of the handle 24 and grasping the juncture 46. The juncture 46 may include a depressed area 56 and an embossed section 58 to enhance its grippability. As illustrated in FIGS. 1–3, the embossed section 58 may display a logo or other symbol instead of (or as well as) letter indicia.

The distal end 32 of the lead 22 has the ring 28 embedded therein, and the clip 30 is rotatably attached to the ring 28. The clip 30 is a standard spring-biased clip known to the art. It is understood that in place of the clip 30, the leash 20 may use any of the attachment means illustrated in the prior art for attaching items to the lead 22. Numerous attachment means which are considered to be equivalent to the clip 30 are illustrated in the patents discussed earlier in this specification.

Preferably, special precautions are taken to prevent the possibility that the ring 28 can be torn from the distal end 32 of the lead 22 when the leash 20 is in use. Initially, as shown best by FIG. 3, the distal end 32 may be made slightly wider and thicker than the remaining portion of the lead 22 in order to enhance its strength. Also, as best illustrated by FIG. 1, the ring 28 may be specially shaped to better anchor it within the distal end 32 of the lead 22. The ring 28 includes at least two substantially linear segments 60 which are attached to each other at an angle and which are embedded within the distal end 32 of the lead 22. This increases the length of the portion of the ring 28 which is embedded within the distal end 32 and thereby increases the connection between the lead 22 and ring 28. Additionally, by aligning the linear segments 60 at an approximate 45° angle to the longitudinal axis of the lead 22, the connection between the lead 22 and the ring 28 is equally strong in directions parallel and perpendicular to the axis of the lead 22. In contrast, if the ring 28 was replaced by a rod which was axially aligned and inserted within the distal end 32 of the lead 22, the rod would resist tearing from the distal end 32 due to forces perpendicular to the lead 22, but would be susceptible to tearing from the distal end 32 from forces parallel to the lead 22. If the ring 28 instead had a rod-like portion inserted within the distal end 32 of the lead 22 at an angle generally perpendicular to the axis of the lead 22, the rod-like portion would ably resist tearing from the distal end 32 due to forces parallel to the lead 22, but would be susceptible to forces perpendicular to the lead 22. It is understood that the linear segments 60 need not be at 45° angles, and that effective anchoring can occur over a wide variety of angles. Additionally, to further decrease the possibility that the ring 28 can be torn from the distal end 32 of the lead 22, it is preferred that the distal end 32 of the lead 22 be shaped so that the linear segments 60 enter the distal end 32 at a substantially perpendicular angle, rather than a substantially acute angle.

In the preferred embodiment of the leash 20, the lead 22 has an overall length of approximately 38 inches (approximately 1 meter). The lead 22 also has a width of approximately 0.63 inches (1.59 cm), and the first and second valleys 34 and 36 have a width of approximately 0.28 inches (0.71 cm). Further, the lead 22 has a thickness of approximately 0.31 inches (0.79 cm) and the depth of the first and second valleys 34 and 36 are approximately 0.09 inches (0.24 cm) each, providing for a minimum lead 22 thickness of approximately 0.13 inches (0.33 cm). The lead 22 has an area of approximately 0.15 square inch (1.0 square cm) and a circumference of approximately 1.7 inches (4.3 cm). The handle 24 has an overall length of approximately 5 inches (12.7 cm), and the grip portion 50 has a width of approximately 3.5 inches (8.9 cm). If the dimensions of the lead 22 are to be varied, it is recommended that the ratio of the height of the ridges 38, 40, 42 and 44 to the cross-sectional area of the lead 22 be increased to best enhance the stiffness of the lead without significantly increasing materials coasts. Additionally, a ratio of at least 4:1 in lead 22 circumference to valley 34, 36 width is recommended to maintain a "bulky" appearance for the lead 22, with the preferred ratio being approximately 6:1.

Figure 4:
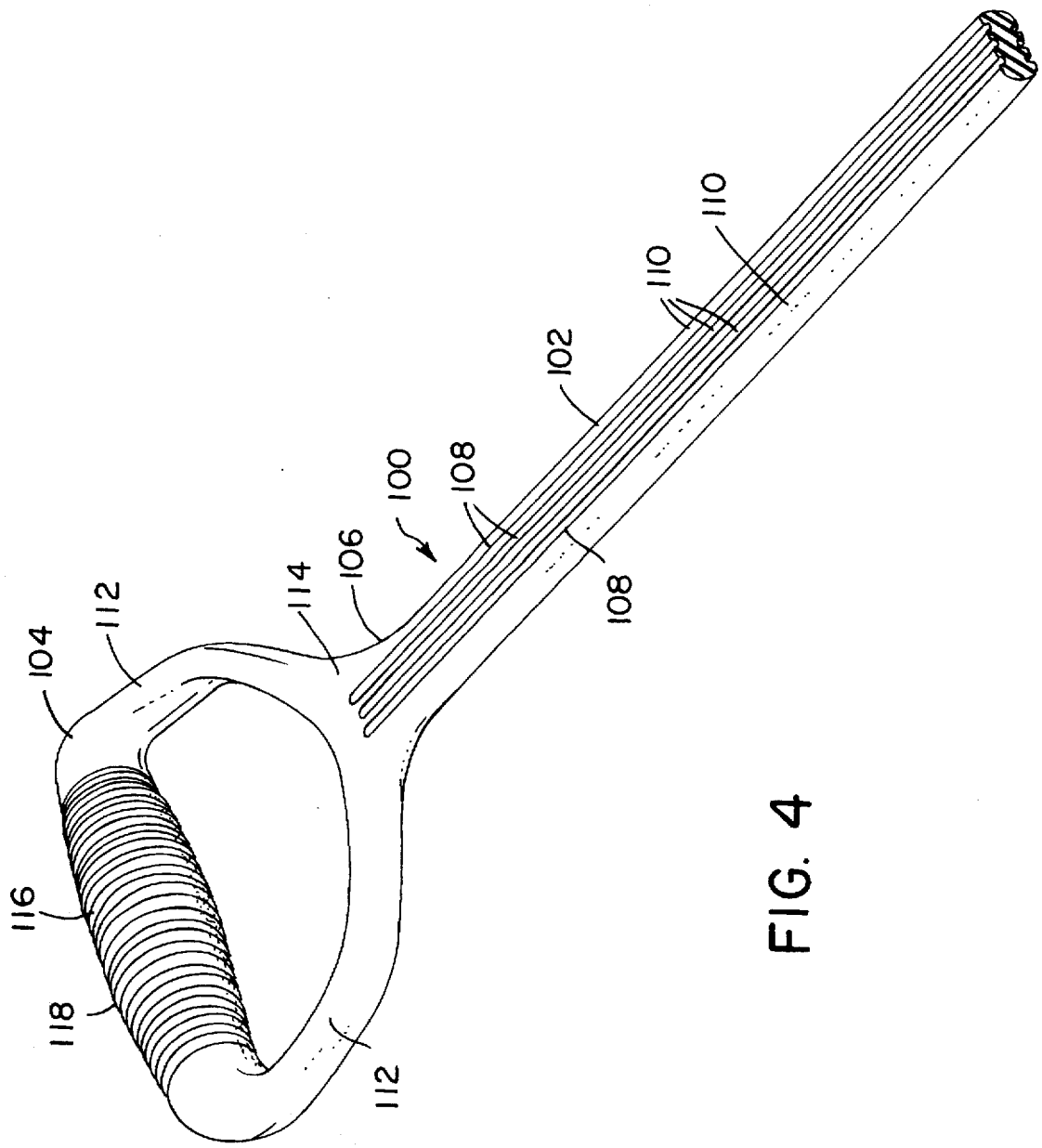
FIG. 4 is a perspective view of a section of a second embodiment of the leash.

A second embodiment of the leash of the present invention is illustrated in FIG. 4 at the reference number 100. The leash 100 includes a lead 102 and a handle 104 at a proximal end 106 of the lead 102. While it is not shown in FIG. 4, attachment means are located at a distal end of the lead 102 in a manner similar to the attachment means noted for the leash 20. The lead 102 may contain any number of valleys 108 on any of its sides to decrease the weight of the lead 102 and to provide stiffening ridges 110. At the handle 104, two generally arcuate side portions 112 extend from a juncture 114 to connect with a generally cylindrical grip portion 116. The grip portion 116 includes a number of generally parallel annular ridges 118 to enhance the grippability of the handle 104.

Figure 5:
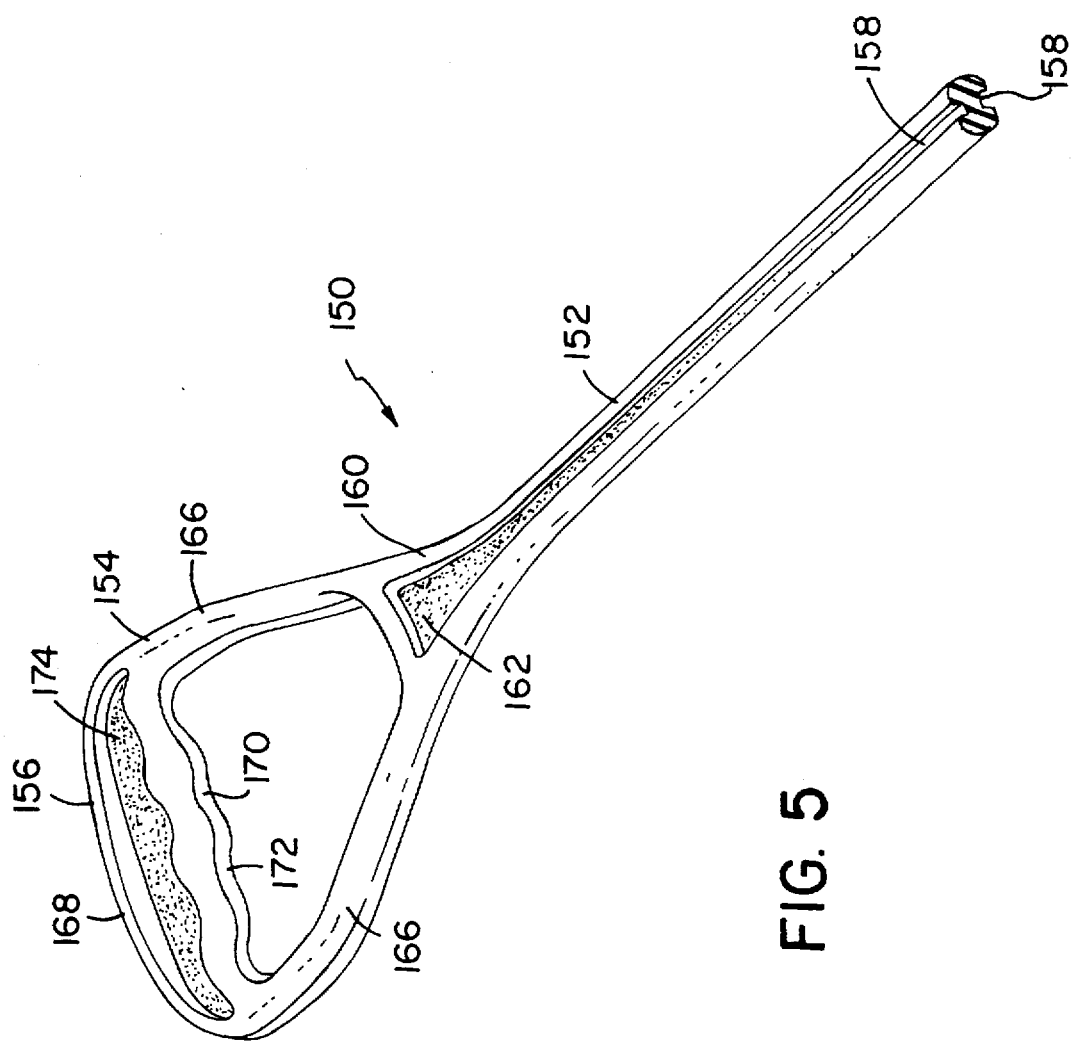
FIG. 5 is a perspective view of a section of a third embodiment of the leash.

A third embodiment of the leash of the present invention is illustrated in FIG. 5 at the reference number 150. The leash 150 includes a lead 152 and a handle 154 at a proximal end 156 of the lead 150. At a distal end of the lead 152, the leash 150 is contemplated to include attachment means similar to those described above for the leash 20. The lead 152 includes valleys 158 which extend along a major portion of the length of the lead 152 and into a juncture 160 between the lead 152 and the handle 154. The wider portion 162 of the valley 160 may include an embossed section therein if desired. The valleys 158 define stiffening ridges 164 which extend from the handle 154 to the distal end of the lead 152. The handle includes side portions 166 which extend from the juncture 160 to connect with a grip portion 168. The interior side 170 of the grip portion 168 includes finger depressions 172 therein to allow the animal owner a comfortable grip. A depressed area 174 is included on the grip portion 178 to further enhance the animal owner's grip, and this depressed area 174 may also include embossed sections if desired.

Figure 6:
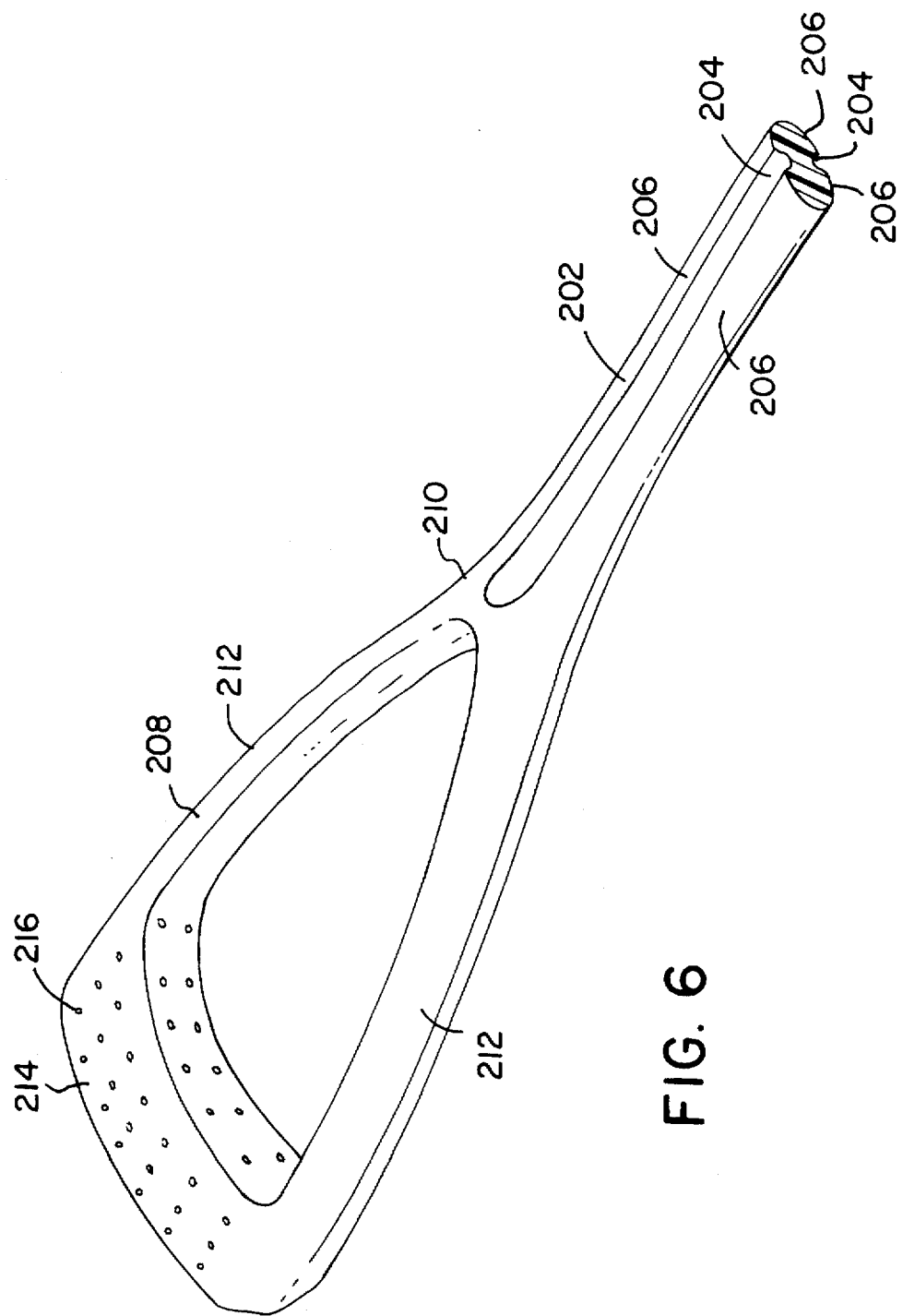
FIG. 6 is a perspective view of a section of a fourth embodiment of the leash.

A fourth embodiment of the leash of the present invention is illustrated in FIG. 6 at the reference number 200. The leash 200 includes a lead 202 having a generally ovular cross-section with valleys 204 therein which define stiffening ridges 206 along the length of the lead 202. The lead 202 is connected to a handle 208 at a juncture 210, and it also includes attachment means at its distal end (not shown in FIG. 6). The handle 208 is defined by two side portions 212 joined to a grip portion 214. The grip portion 214 includes protrusions 216 about its circumference to enhance the animal owner's grip.

Figure 7:
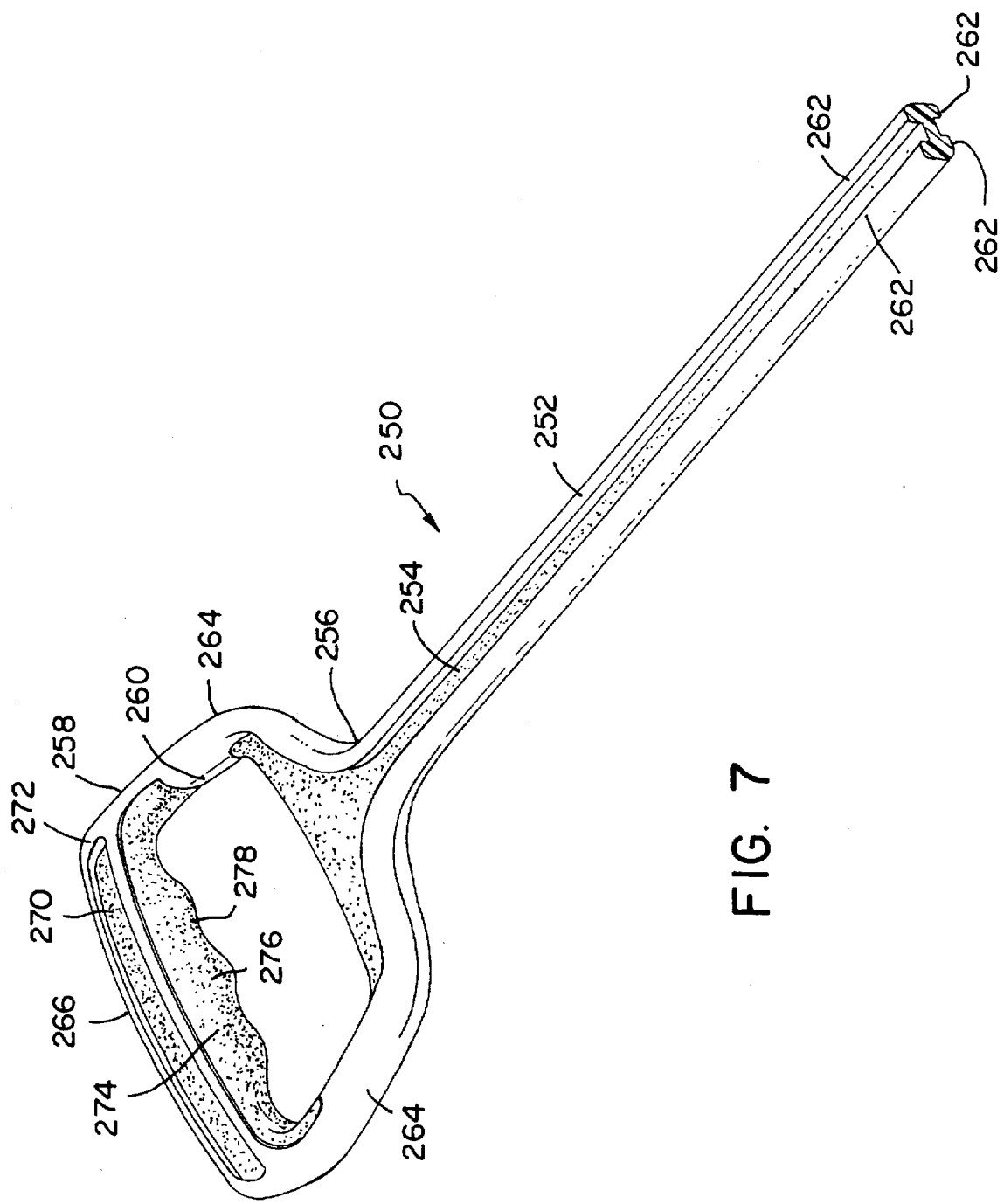
FIG. 7 is a perspective view of a section of a fifth embodiment of the leash.

A fifth embodiment of the leash of the present invention is illustrated in FIG. 7 at the reference number 250. The leash 250 includes a lead 252 having a valley 254 therein which extends along the length of the lead 252, into a juncture 256 between the lead 252 and a handle 258, and into the inner perimeter 260 of the handle 258 itself. Thus, the valley 254 provides stiffening ridges 262 which reinforce both the lead 252 and the handle 258. The handle 258 includes two side portions 264 and a grip portion 266. The side portions 264 have dimensions which are generally defined by the dimensions of the stiffening ridges 262. Therefore, the portion of the juncture 256 between the side portions 264 defines a stiffening web 268 which reinforces the handle 258 and provides it with greater rigidity. The grip portion 266 has two depressed areas, a depressed area 270 on the top side 272 of the grip portion 266 and a depressed area 274 on an inner perimeter 276 of the grip portion 266. The depressed area 274 preferably includes finger depressions 278 similar to those discussed above for the leash 150. If desired, the depressed area 270 may include embossed sections therein which are similar to those discussed for the previous embodiments.

Figure 8:
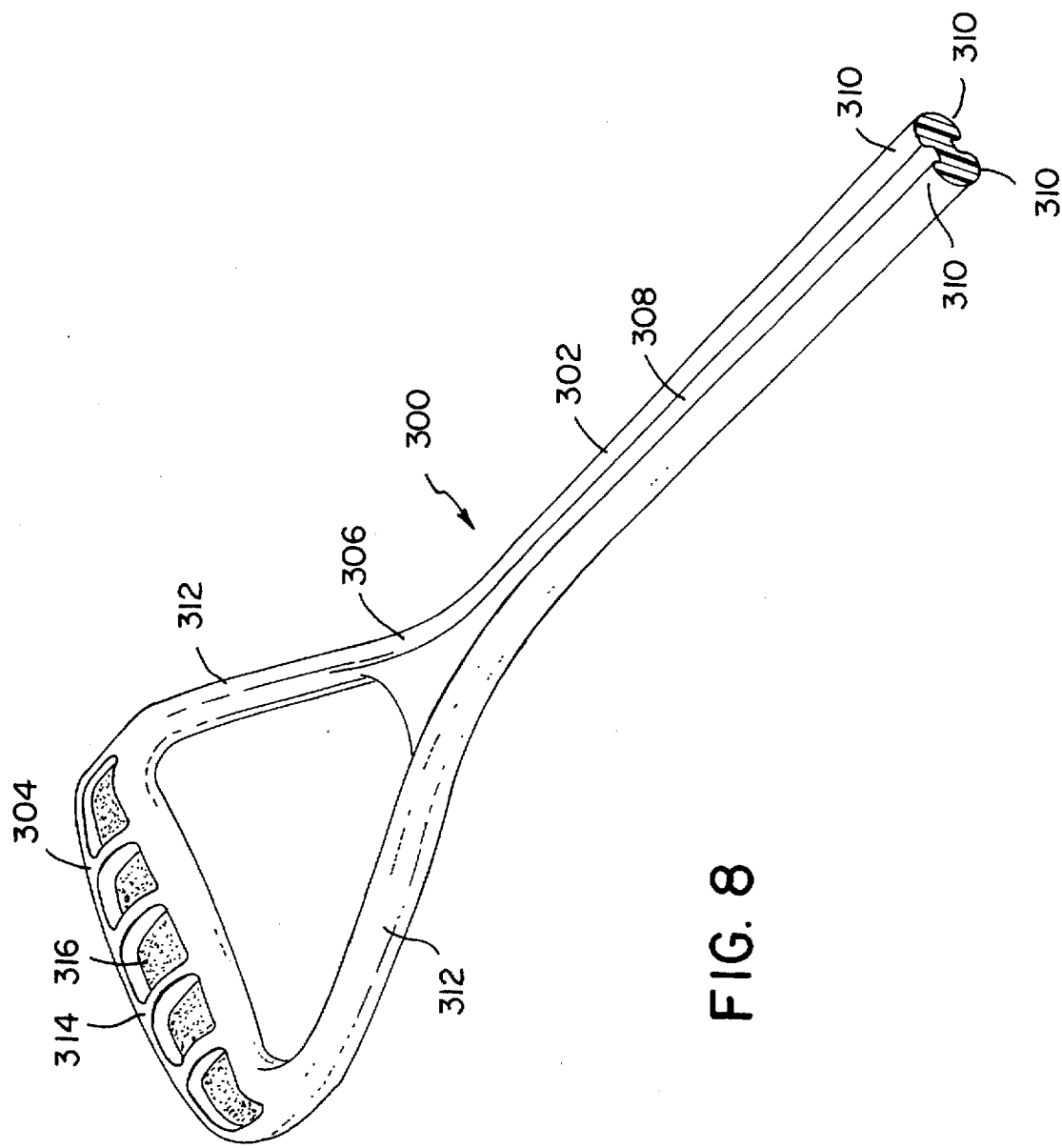
FIG. 8 is a perspective view of a section of a sixth embodiment of the leash.

A sixth embodiment of the leash of the present invention is shown in FIG. 8 at the reference number 300. The leash 300 includes a lead 302 connected to a handle 304 at a juncture 306. A valley 308 extends along the length of the lead 302, through the juncture 306, and into the handle 304. The valley 308 defines stiffening ridges 310 which extend into the handle 304 and define the side portions 312 of the handle 304. The side portions 312 are joined to a grip portion 314 which includes a number of depressed areas 316 therein. These depressed areas 316 may include embossed sections therein if desired.

Figure 9:
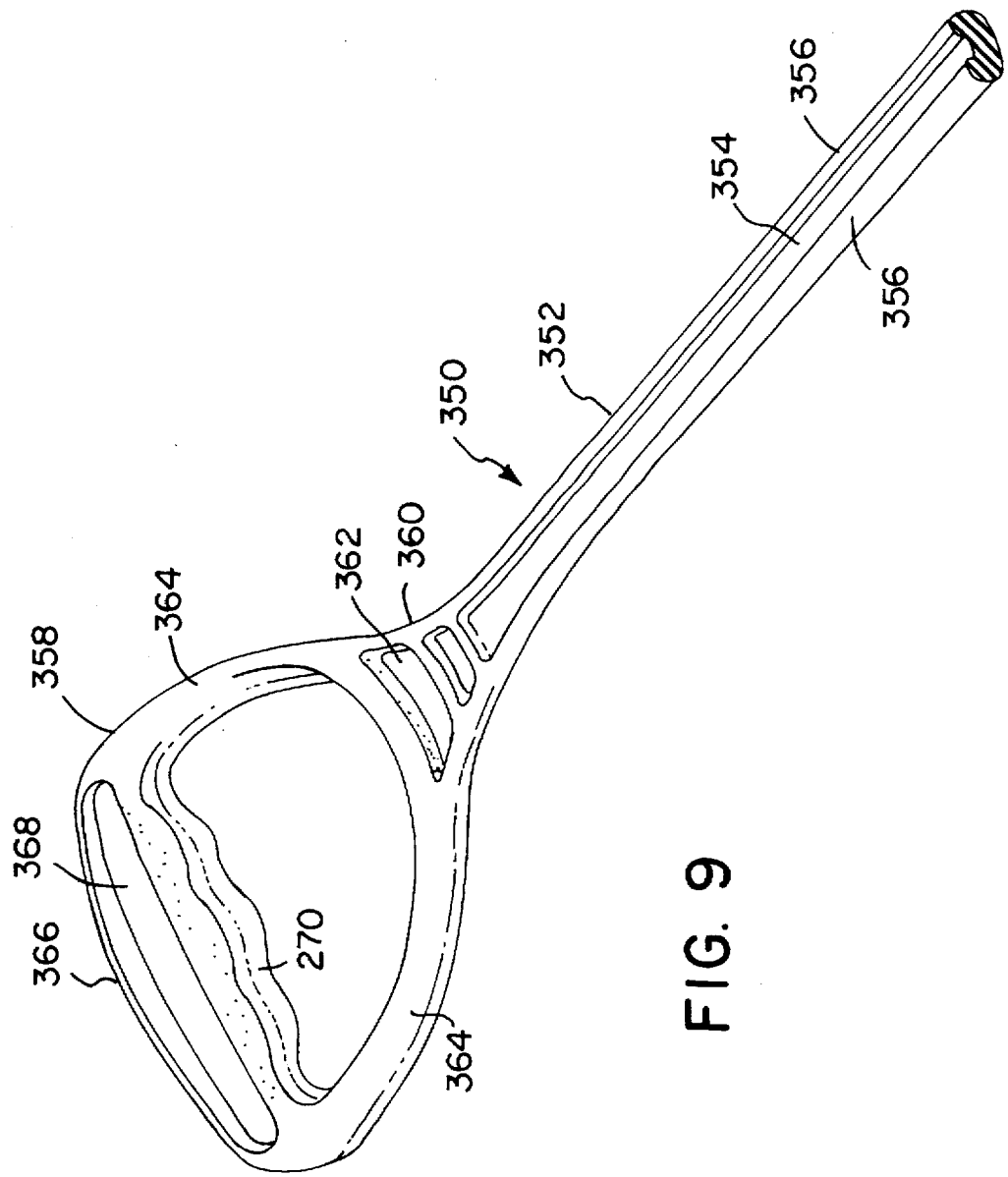
FIG. 9 is a perspective view of a section of a seventh embodiment of the leash.

A seventh embodiment of the leash of the present invention is shown in FIG. 9 at the reference number 350. The leash 350 includes a lead 352 having a single valley 354 therein, thereby defining a C-shaped cross-section for the lead 352. Thus, stiffening ridges 356 are only included on one side of the leash 350. The lead 352 is joined to a handle 358 at a juncture 360 wherein several depressed areas 362 are located. The 360 juncture is connected to side portions 364 which are in turn connected to a grip portion 366 to define the handle 358. The grip portion 366 includes a depressed area 368 therein, and it further includes finger depressions 270 on the inner side of the grip portion 366.

Figure 10:
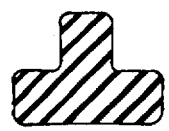
FIG. 10 is a cross-section of a T-shaped lead for an eighth embodiment of the leash.
Figure 11:
FIG. 11 is a cross-section of an S-shaped lead for a ninth embodiment of the leash.
Figure 12:
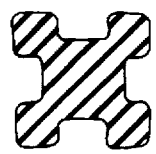
FIG. 12 is a cross-section of an X-shaped lead for a tenth embodiment of the leash.

FIGS. 10–12 illustrate possible cross-sectional configurations for leads of other alternate embodiments of leash leads. FIG. 10 illustrates a lead having a T-shaped cross-section, FIG. 11 illustrates a lead having a S-shaped cross-section, and FIG. 12 illustrates a lead having a X-shaped cross-section. Assuming constant lead thickness and cross-sectional area, elongated leads having at least two valleys, as in "I," "T," and "S" beams, are generally more resistant to slack than leashes which include elongated leads having only one valley, as in "C" beams. The X-shaped embodiment of FIG. 12 is notable because it provides greater resistance to unwanted bending in all directions perpendicular to the lead, and it also has an aesthetically pleasing symmetric appearance. Further, it provides a visual impression of greater size and strength.

Figure 13:
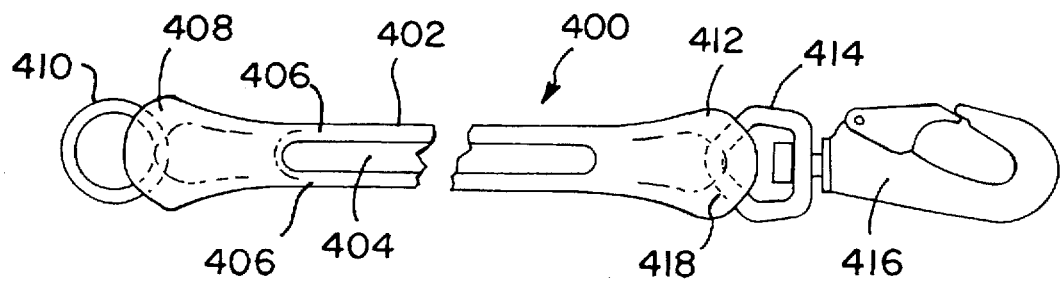
FIG. 13 is a side elevated view of an extender lead suitable for use with the leash of the present invention.

FIG. 13 illustrates an extender lead 400 suitable for use with any of the leashes described above or the leashes of the prior art. The extender lead 400 is integrally molded of a substantially elastic material, similarly to the leashes of the present invention. The extender lead 400 includes an elongated section 402 with one or more valleys 404 therein. The valleys 404 define stiffening ridges 406 on the elongated section 402 at the sides of the valleys 404. A proximal end 408 of the elongated section 402 includes a first ring 410 embedded therein, and a distal end 412 of the elongated section 402 includes a second ring 414 imbedded therein. A clip 416 or equivalent attachment means is attached to the second ring 414. To utilize the extender lead 400, the first ring 410 is affixed to the attachment means of a leash and the clip 416 is then attached to the collar or harness of the animal. The extender lead 400 provides a means for extending the effective length of a leash while simultaneously providing many of the advantages of the leashes of the present invention.

As illustrated in FIG. 13, the second ring 414 includes linear segments 418 to better anchor the second ring 414 within the distal end 412 of the elongated section 402. If desired, the first ring 410 could be similarly formed to provide better anchoring at the proximal end 408 of the elongated section 402.

It is understood that the present invention encompasses leashes having macroscopic concavities or depressions within their leads which do not extend over the entire length of the leads. As an example, a leash according to the present invention could incorporate one or more depressed areas on the lead such as the depressed areas 362 illustrated at the juncture 360 of the leash 350, or it could include one or more ridges extending along only a portion of the length of the lead, in order to obtain the desired lead stiffness, leash weight, and leash appearance. Moreover, it is understood that the ridges, valleys, and the width and thickness of the lead may be varied in size along the length of the lead to produce a non-prismatic lead (i.e., a lead having a nonuniform cross-section) wherein the stiffness of the lead varies at different areas. For example, the ridges may have a smaller size at the proximal and distal ends of the lead and a larger size therebetween so that the midsection of the lead resists sagging, but the flexibility of the lead adjacent the handle and clip is enhanced. It is also understood that if a flexible porous or foamed synthetic material is used to form the leash, the pore density of the foamed material may be varied along the length of the lead to add rigidity at desired locations.

It is understood that the invention is not confined to the particular construction of parts and uses described and illustrated above, and rather the invention embraces such modified embodiments that come within the scope of the following claims. Further, it is understood that in these claims, means plus function clauses are intended to cover the structures described herein as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

I claim:

1. A leash comprising an elongated elastomeric lead including at least one macroscopic concave depression therein, wherein the macroscopic concave depression includes embossed indicia therein.

2. The leash of claim 1 further comprising first attachment means at one end of the lead for attachment to an animal, and second attachment means at the opposite end of the lead for attachment to a second leash.

3. The leash of claim 1 wherein the macroscopic concave depression extends along a major portion of the length of the lead.

4. The leash of claim 1 wherein the lead has a cross-section consisting of one of the following shapes: I-shaped, T-shaped, C-shaped, X-shaped, and S-shaped.

5. The leash of claim 1 wherein the ratio of the circumference of the lead to the width of the depression is greater than approximately 4:1.

6. The leash of claim 1 further comprising a substantially rigid handle integrally formed with one end of the lead.

7. The leash of claim 6 wherein the handle includes two side portions extending from the lead and a grip portion extending between the side portions, thereby defining a handle loop.

8. The leash of claim 1 further comprising first attachment means for attachment to an animal, the attachment means including at least two substantially linear segments attached thereto, wherein the substantially linear segments are at least partially embedded within one end of the lead.

9. The leash of claim 8 wherein at least one linear segment is at an angle of approximately 45° to the longitudinal axis of the lead.

10. The leash of claim 9 wherein at least one linear segment enters the end of the lead at a substantially perpendicular angle.

11. A leash comprising:

a. an elongated substantially elastic integrally molded lead including at least two stiffening ridges thereon;

b. a substantially rigid handle integrally formed with one end of the lead, the handle including two side portions extending from the lead and a grip portion therebetween, wherein the two stiffening ridges extend continuously onto the handle to define the side portions.

12. The leash of claim 11 wherein the lead has a substantially uniform cross-section along a major portion of its length.

13. The leash of claim 11 wherein the lead has a cross-section consisting of one of the following shapes: I-shaped, T-shaped, C-shaped, X-shaped, and S-shaped.

14. The leash of claim 11 including at least one depressed area formed therein.

15. The leash of claim 14 wherein at least one depressed area includes embossed indicia therein.

16. The leash of claim 11 including at least one depressed area formed within the handle.

17. The leash of claim 16 wherein at least one depressed area includes embossed indicia therein.

18. A leash comprising:

a. an elongated elastomeric lead including at least one macroscopic concave depression therein;

b. first attachment means for attachment to an animal, the attachment means including at least two substantially linear segments attached thereto, wherein the substantially linear segments are at least partially embedded within one end of the lead.

19. The leash of claim 18 wherein the macroscopic concave depression includes embossed indicia therein.

20. The leash of claim 18 wherein at least one linear segment is at an angle of approximately 45° to the longitudinal axis of the lead.

21. The leash of claim 18 wherein at least one linear segment enters the end of the lead at a substantially perpendicular angle.

22. The leash of claim 18 further comprising a substantially rigid handle integrally formed with one end of the lead, wherein the handle includes two side portions extending from the lead and a grip portion therebetween, and further wherein each macroscopic concavity rests between a pair of stiffening ridges provided on the lead, the stiffening ridges extending continuously onto the handle to define the side portions.

* * * * *